US012729329B2

(12) United States Patent
Itoh et al.

(10) Patent No.: US 12,729,329 B2
(45) Date of Patent: Sep. 8, 2026

(54) CURING-REACTIVE ORGANOPOLYSILOXANE RESIN, PRESSURE-SENSITIVE ADHESIVE COMPOSITION USING SAME, AND USE THEREOF

(71) Applicant: DOW TORAY CO., LTD., Tokyo (JP)

(72) Inventors: Maki Itoh, Ichihara (JP); Hidefumi Tanaka, Ichihara (JP); Akihiro Nakamura, Ichihara (JP); Masahiro Saito, Ichihara (JP); Michitaka Suto, Ichihara (JP)

(73) Assignee: DOW TORAY CO., LTD., Tokyo (JP)

( * ) Notice: Subject to any disclaimer, the term of this patent is extended or adjusted under 35 U.S.C. 154(b) by 621 days.

(21) Appl. No.: 18/205,163

(22) Filed: Jun. 2, 2023

(65) Prior Publication Data

US 2023/0392060 A1 Dec. 7, 2023

Related U.S. Application Data

(62) Division of application No. 16/500,358, filed as application No. PCT/JP2018/010769 on Mar. 19, 2018, now abandoned.

(30) Foreign Application Priority Data

Apr. 3, 2017 (JP) ................................ 2017-073475

(51) Int. Cl.

| | |
|---|---|
| ***C09J 183/04*** | (2006.01) |
| ***B32B 27/08*** | (2006.01) |
| ***B32B 27/30*** | (2006.01) |
| ***C09J 7/10*** | (2018.01) |
| ***C09J 7/38*** | (2018.01) |
| ***C09J 11/04*** | (2006.01) |
| ***G06F 3/041*** | (2006.01) |

(52) U.S. Cl.

CPC ............. *C09J 183/04* (2013.01); *B32B 27/08* (2013.01); *B32B 27/30* (2013.01); *C09J 7/10* (2018.01); *C09J 7/38* (2018.01); *C09J 11/04* (2013.01); *G06F 3/0414* (2013.01); *B32B 2307/202* (2013.01); *B32B 2307/412* (2013.01); *B32B 2307/42* (2013.01); *B32B 2405/00* (2013.01); *B32B 2457/208* (2013.01); *C09J 2483/00* (2013.01); *Y10T 428/2852* (2015.01); *Y10T 428/2878* (2015.01)

(58) Field of Classification Search

CPC ........... C09J 183/04; C08L 83/00; C08K 5/56
See application file for complete search history.

(56) References Cited

U.S. PATENT DOCUMENTS

| | | | | |
|---|---|---|---|---|
| 3,983,298 | A * | 9/1976 | Hahn | C09J 7/38 428/447 |
| 4,051,454 | A | 9/1977 | Leiser et al. | |
| 4,082,726 | A | 4/1978 | Mine et al. | |
| 4,087,585 | A | 5/1978 | Schulz | |
| 5,248,739 | A | 9/1993 | Schmidt et al. | |
| 5,290,885 | A | 3/1994 | Vincent et al. | |
| 5,366,809 | A | 11/1994 | Schmidt et al. | |
| 6,121,368 | A | 9/2000 | Heying et al. | |
| 8,044,153 | B2 | 10/2011 | Yamamoto et al. | |
| 8,206,779 | B2 | 6/2012 | Suzuki et al. | |
| 10,125,242 | B2 | 11/2018 | Iimura et al. | |
| 10,618,255 | B2 | 4/2020 | Choi et al. | |
| 2004/0097639 | A1 | 5/2004 | Gordon et al. | |
| 2006/0172140 | A1 | 8/2006 | Kuroda et al. | |
| 2007/0047754 | A1 | 3/2007 | Kishi | |
| 2007/0059535 | A1 * | 3/2007 | Nakamura | C08L 83/00 428/447 |
| 2007/0134425 | A1 | 6/2007 | Morita et al. | |

(Continued)

FOREIGN PATENT DOCUMENTS

| | | | |
|---|---|---|---|
| CN | 1714117 | A | 12/2005 |
| CN | 104387778 | A | 3/2015 |

(Continued)

OTHER PUBLICATIONS

Machine assisted English translation of WO2018149717A1 obtained from https://worldwide.espacenet.com/patent on Aug. 29, 2023, 15 pages.
English translation of International Search Report for PCT/JP2018/010769 dated Jun. 12, 2018, 2 pages.
International Search Report (with translation) for PCT/JP2020/030623 dated Oct. 27, 2020, 4 pages.
International Search Report (with translation) for PCT/JP2020/030625 dated Oct. 27, 2020, 4 pages.
International Search Report (with translation) for PCT/JP2020/030624 dated Oct. 27, 2020, 4 pages.
Machine assisted English translation of JP2002322363 obtained from https://worldwide.espacenet.com/patent on Oct. 17, 2023, 21 pages.

(Continued)

*Primary Examiner* — Anthony J Frost
(74) *Attorney, Agent, or Firm* — Warner Norcross + Judd LLP

(57) ABSTRACT

A curing-reactive organopolysiloxane composition is provided. The composition generally forms a pressure-sensitive adhesive layer which is curable by a hydrosilylation reaction, has excellent adhesiveness and handleability, and is capable of maintaining high transparency over an extended period of time without developing problems such as discoloration or coloration, even when subjected to long-term aging at a high temperature and even when exposed to high-energy rays such as UV rays over an extended period of time. The curing-reactive organopolysiloxane composition can be cured via hydrosilylation reaction. A content of platinum-based metal among a solid content is in the range of from 0.1 to 50 ppm. An adhesive force of a cured layer with a thickness of 50 μm obtained by curing the composition is not less than 0.02N/25 mm. A pressure-sensitive adhesive layer obtained by curing the composition, and an electronic part or a display device using the same, are also provided.

6 Claims, No Drawings

(56) References Cited

U.S. PATENT DOCUMENTS

| | | | |
|---|---|---|---|
| 2009/0118441 | A1 | 5/2009 | Yamamoto et al. |
| 2009/0146324 | A1* | 6/2009 | Auld ...................... C08L 83/04 257/E23.116 |
| 2010/0323145 | A1 | 12/2010 | Aoki |
| 2011/0097579 | A1 | 4/2011 | Mizuno et al. |
| 2012/0040180 | A1 | 2/2012 | Husemann et al. |
| 2012/0113361 | A1 | 5/2012 | Huang et al. |
| 2012/0175045 | A1 | 7/2012 | Furuya et al. |
| 2012/0231245 | A1 | 9/2012 | Kim et al. |
| 2013/0069890 | A1 | 3/2013 | Lee et al. |
| 2013/0101840 | A1 | 4/2013 | Yang et al. |
| 2013/0101841 | A1 | 4/2013 | Yang et al. |
| 2013/0186564 | A1 | 7/2013 | Keller et al. |
| 2015/0183951 | A1 | 7/2015 | Bhagwagar et al. |
| 2015/0337188 | A1 | 11/2015 | Sakakibara et al. |
| 2015/0376488 | A1 | 12/2015 | Tan et al. |
| 2017/0152350 | A1 | 6/2017 | Heikkinen et al. |
| 2017/0190878 | A1 | 7/2017 | Iimura et al. |
| 2017/0217143 | A1 | 8/2017 | Kim et al. |
| 2017/0342677 | A1 | 11/2017 | Uno et al. |
| 2018/0065347 | A1 | 3/2018 | Fukui et al. |
| 2018/0208799 | A1 | 7/2018 | Liu et al. |
| 2018/0258332 | A1 | 9/2018 | Song et al. |
| 2018/0362810 | A1 | 12/2018 | Bogner et al. |
| 2019/0134946 | A1 | 5/2019 | Choi et al. |
| 2019/0292320 | A1 | 9/2019 | Watanabe et al. |
| 2020/0131408 | A1 | 4/2020 | Otake et al. |
| 2020/0224069 | A1 | 7/2020 | Itoh et al. |
| 2020/0354615 | A1 | 11/2020 | Itoh et al. |
| 2020/0392383 | A1 | 12/2020 | Hino et al. |
| 2021/0246342 | A1 | 8/2021 | Jang et al. |
| 2021/0269691 | A1 | 9/2021 | Itoh et al. |
| 2021/0284888 | A1 | 9/2021 | Itoh et al. |
| 2021/0292607 | A1 | 9/2021 | Itoh et al. |
| 2021/0317353 | A1 | 10/2021 | Kuroda |
| 2022/0275251 | A1 | 9/2022 | Itoh et al. |
| 2022/0275262 | A1 | 9/2022 | Itoh et al. |
| 2022/0282142 | A1 | 9/2022 | Degroot, Jr. et al. |
| 2022/0372345 | A1 | 11/2022 | Tse et al. |
| 2023/0144102 | A1 | 5/2023 | Ihara et al. |
| 2023/0174721 | A1 | 6/2023 | Liu et al. |
| 2023/0193093 | A1 | 6/2023 | Cao et al. |
| 2023/0265324 | A1 | 8/2023 | Kelley et al. |
| 2024/0009343 | A1 | 1/2024 | Yu et al. |
| 2024/0043623 | A1 | 2/2024 | Yamazaki et al. |
| 2024/0059932 | A1 | 2/2024 | Onodera et al. |
| 2024/0270965 | A1 | 8/2024 | Cao et al. |
| 2024/0294814 | A1 | 9/2024 | Cao et al. |

FOREIGN PATENT DOCUMENTS

| | | | |
|---|---|---|---|
| CN | 106118584 | A | 11/2016 |
| CN | 107250313 | A | 10/2017 |
| EP | 0537784 | A1 | 4/1993 |
| EP | 0581539 | A2 | 2/1994 |
| EP | 2322584 | A1 | 5/2011 |
| EP | 2570899 | A2 | 3/2013 |
| EP | 2627714 | A1 | 8/2013 |
| EP | 2788448 | A1 | 10/2014 |
| EP | 2865719 | A1 | 4/2015 |
| JP | S62181357 | A | 8/1987 |
| JP | H05214316 | A | 8/1993 |
| JP | H06228526 | A | 8/1994 |
| JP | H7197008 | A | 8/1995 |
| JP | H08209104 | A | 8/1996 |
| JP | 2000044921 | A | 2/2000 |
| JP | 2001081436 | A | 3/2001 |
| JP | 2002322363 | A | 11/2002 |
| JP | 2006213810 | A | 8/2006 |
| JP | 2006225420 | A | 8/2006 |
| JP | 2007009189 | A | 1/2007 |
| JP | 2007131694 | A | 5/2007 |
| JP | 2009051916 | A | 3/2009 |
| JP | 2010108038 | A | 5/2010 |
| JP | 2010248413 | A | 11/2010 |
| JP | 2013065009 | A | 4/2013 |
| JP | 2013512326 | A | 4/2013 |
| JP | 2013233852 | A | 11/2013 |
| JP | 2014063064 | A | 4/2014 |
| JP | 5553395 | B2 | 7/2014 |
| JP | 2014182335 | A | 9/2014 |
| JP | 2014522436 | A | 9/2014 |
| JP | 5753103 | B2 | 7/2015 |
| JP | 2017047767 | A | 3/2017 |
| JP | 6417310 | B2 | 11/2018 |
| JP | 2019031610 | A | 2/2019 |
| KR | 20160083583 | A | 7/2016 |
| KR | 20180012966 | A | 2/2018 |
| TW | 201704348 | A | 2/2017 |
| WO | 2004046225 | A1 | 6/2004 |
| WO | 2012166870 | A1 | 12/2012 |
| WO | 2015151221 | A1 | 10/2015 |
| WO | 2016139955 | A1 | 9/2016 |
| WO | 2017038913 | A1 | 3/2017 |
| WO | 2017038920 | A1 | 3/2017 |
| WO | 2017048890 | A1 | 3/2017 |
| WO | 2017082654 | A1 | 5/2017 |
| WO | 2017188308 | A1 | 11/2017 |
| WO | 2018048240 | A1 | 3/2018 |
| WO | 2018048245 | A1 | 3/2018 |
| WO | 2018149717 | A1 | 8/2018 |
| WO | 2018186161 | A1 | 10/2018 |
| WO | 2018193973 | A1 | 10/2018 |
| WO | 2019009175 | A1 | 1/2019 |
| WO | 2020032285 | A1 | 2/2020 |
| WO | 2020032286 | A1 | 2/2020 |
| WO | 2020032287 | A1 | 2/2020 |
| WO | 2021081863 | A1 | 5/2021 |

OTHER PUBLICATIONS

Machine assisted English translation of KR20160083583 obtained from https://worldwide.espacenet.com/patent on Oct. 17, 2023, 26 pages.

Machine assisted English translation of JP2019031610 obtained from https://worldwide.espacenet.com/patent on Oct. 17, 2023, 14 pages.

Machine assisted English translation of JP6417310 obtained from https://worldwide.espacenet.com/patent on Oct. 17, 2023, 10 pages.

Machine assisted English translation of JP5553395 obtained from https://worldwide.espacenet.com/patent on Oct. 17, 2023, 20 pages.

Machine assisted English translation of WO2018048245 obtained from https://worldwide.espacenet.com/patent on Oct. 17, 2023, 21 pages.

Machine assisted English translation of WO2018048240 obtained from https://worldwide.espacenet.com/patent on Oct. 17, 2023, 24 pages.

Machine assisted English translation of KR20180012966 obtained from https://worldwide.espacenet.com/patent on Oct. 17, 2023, 19 pages.

Machine assisted English translation of WO2017038920 obtained from https://worldwide.espacenet.com/patent on Oct. 17, 2023, 17 pages.

Machine assisted English translation of WO2017038913 obtained from https://worldwide.espacenet.com/patent on Oct. 17, 2023, 17 pages.

Machine assisted English translation of WO2015151221 obtained from https://worldwide.espacenet.com/patent on Oct. 17, 2023, 16 pages.

Machine assisted English translation of CN107250313A obtained from https://patents.google.com/patent on Nov. 3, 2022, 9 pages.

Machine assisted English translation of JP2006225420A obtained from https://patents.google.com/patent on Nov. 3, 2022, 9 pages.

Machine assisted English translation of JP2013233852A obtained from https://patents.google.com/patent on Nov. 3, 2022, 9 pages.

Machine assisted English translation of JP2014063064A obtained from https://patents.google.com/patent on Nov. 3, 2022, 9 pages.

Machine assisted English translation of JP2014182335A obtained from https://patents.google.com/patent on Nov. 3, 2022, 12 pages.

(56) References Cited

OTHER PUBLICATIONS

Machine assisted English translation of JP2017047767A obtained from https://patents.google.com/patent on Nov. 3, 2022, 9 pages.
Machine assisted English translation of JPH08209104A obtained from https://patents.google.com/patent on Nov. 3, 2022, 6 pages.
Machine assisted English translation of WO2016139955A1 obtained from https://patents.google.com/patent on Nov. 3, 2022, 9 pages.
Machine assisted English translation of CN104387778A obtained from https://patents.google.com/patent on Nov. 3, 2022, 8 pages.
Machine assisted English translation of CN106118584A obtained from https://patents.google.com/patent on Nov. 3, 2022, 12 pages.
Machine assisted English translation of JP2000044921A obtained from https://patents.google.com/patent on Nov. 3, 2022, 8 pages.
Machine assisted English translation of JP2007009189A obtained from https://patents.google.com/patent on Nov. 3, 2022, 8 pages.
Machine assisted English translation of JP2010108038A obtained from https://patents.google.com/patent on Nov. 3, 2022, 10 pages.
Machine assisted English translation of JP2010248413A obtained from https://patents.google.com/patent on Nov. 3, 2022, 8 pages.
Machine assisted English translation of JPS62181357A obtained from https://worldwide.espacenet.com/patent on Nov. 3, 2022, 4 pages.

* cited by examiner

CURING-REACTIVE ORGANOPOLYSILOXANE RESIN, PRESSURE-SENSITIVE ADHESIVE COMPOSITION USING SAME, AND USE THEREOF

CROSS-REFERENCE TO RELATED APPLICATIONS

This application is a Divisional of National Stage application Ser. No. 16/500,328 filed on 2 Oct. 2019, which claims priority to and all advantages of International Appl. No. PCT/JP2018/010769 filed on 19 Mar. 2018, which claims priority to and all advantages of Japanese Appl. No. 2017-073475 filed on 3 Apr. 2017, the contents of which are hereby incorporated by reference.

TECHNICAL FIELD

The present invention relates to a curing-reactive organopolysiloxane composition that is resistant to discoloration and forms a transparent pressure-sensitive adhesive layer. More particularly, the present invention relates to a curing-reactive organopolysiloxane composition that forms a pressure-sensitive adhesive layer capable of maintaining high transparency over an extended period of time without developing problems such as discoloration or coloration, even when subjected to long-term aging at a high temperature and even when exposed to high-energy rays such as UV rays over an extended period of time. In addition, the present invention relates to a pressure-sensitive adhesive composition that uses the curing-reactive organopolysiloxane composition, and applications such as an electronic part or a display device (including a touch panel) that use the composition.

BACKGROUND ART

Polysiloxane pressure-sensitive adhesive compositions have excellent electrical insulating properties, heat resistance, cold resistance, and adhesion to various adherends in comparison to acrylic or rubber-based pressure-sensitive adhesive compositions, and are therefore used in heat-resistant adhesive tapes, electrically insulating adhesive tapes, heat seal tapes, plating masking tapes, and the like. These polysiloxane pressure-sensitive adhesive compositions are classified into addition reaction curing types, condensation reaction curing types, peroxide curing types, and the like based on the curing mechanisms thereof. Addition reaction curing type pressure-sensitive adhesive compositions are widely used because the compositions cure quickly when left to stand at room temperature or by heating and do not generate by-products.

Taking advantage of the above characteristics and high transparency of polysiloxane pressure-sensitive adhesives, applications to the field of advanced electronic display elements such as smart devices have been investigated in recent years. Such a device assumes a structure in which a film made of a plurality of layers including an electrode layer and a display layer is sandwiched between transparent substrates, and a polysiloxane pressure-sensitive adhesive having high heat resistance, cold resistance, and transparency is expected to work effectively for the purpose of protecting the electrode layer and the display layer and improving adhesion between layers. For example, the structure of an optically transparent silicone-based pressure-sensitive adhesive film and a display device such as a touch panel using the same is disclosed in Japanese Unexamined Patent Application Publication (Translation of PCT Application) No. 2014-522436 (Patent Document 1), Japanese Unexamined Patent Application Publication (Translation of PCT Application) No. 2013-512326 (Patent Document 2), and the like.

However, when a known silicone-based pressure-sensitive adhesive is used in a display device such as a touch panel, an adhesive layer formed from the silicone-based pressure-sensitive adhesive may undergo coloration (including yellowing or loss of transparency) in step with heat generation or light exposure from the device main body or heat or light exposure originating from the environment such as an on-board display, which may cause problems such as the deterioration of display function or poor appearance.

On the other hand, in the field of curable silicone compositions other than pressure-sensitive adhesives, an addition-curable silicone resin composition having reduced platinum content (Patent Document 3) and a polysiloxane gel composition (Patent Document 4) are known, and it has been disclosed that the prevention of discoloration caused by the sulfurization of silver plating serving as a substrate or the stability against discoloration or changes in hardness caused by thermal degradation of the silicone is improved. However, these compositions are sealing materials or protective materials of semiconductors or the like, and there has been no disclosure of any composition capable of functioning as an adhesive layer or a pressure-sensitive adhesive layer. Further, an organopolysiloxane composition capable of forming an adhesive layer or a pressure-sensitive adhesive layer by curing typically contains a silicone resin having low reactivity and an organopolysiloxane having a high degree of polymerization as main components in order to realize pressure-sensitive adhesion, and the composition has a relatively low content of alkenyl groups (carbon-carbon double bond moieties such as vinyl groups) and density of alkenyl groups in the composition, and therefore, when attempting to reduce the platinum content to the level described in Patent Document 3 or the like (5 ppm or lower), problems with poor curing may occur in a silicone-based pressure-sensitive adhesive. Therefore, it is typical to not select such a low platinum level. That is, the inventions disclosed in these documents differ from the problems and technical fields of the present invention with regard to the prevention of the discoloration of the transparent adhesive layer itself formed from a silicone-based pressure-sensitive adhesive, and it is not easy to apply the technical elements thereof to a silicone pressure-sensitive adhesive.

In contrast, in the field of silicone-based pressure-sensitive adhesives, it has been proposed in Patent Document 5 that by blending a reaction mixture of an alkenyl group-containing polyorganosiloxane and a so-called MQ resin, residual glue or discoloration can be prevented from occurring on a substrate such as stainless steel when exposed to a high temperature, in particular. However, in Patent Document 5, only a very wide range such as from 5 to 2000 ppm is disclosed for the amount of platinum that is used, and the "discoloration" in Patent Document 5 is not that of the coloration of the pressure-sensitive adhesive, and rather, is the coloration of the stainless steel surface. The invention differs in the technical problem and solution from the prevention of the discoloration of a transparent adhesive layer itself formed from a silicone-based pressure-sensitive adhesive, and it is difficult to solve this problem.

Patent Document 6 proposes an addition type silicone adhesive composition having a small degree of discoloration during high-temperature exposure as a result of using a combination of a (meth)acryloxyalkyl-modified organopolysiloxane and a zirconium compound. However, it is not possible to form a transparent adhesive layer because the addition type silicone adhesive composition assumes a milky white color or the like, and therefore, such cannot be applied to a display device or the like requiring transparency, and only a very wide range such as 0.5 to 200 ppm is disclosed for the amount of platinum that is used. In addition, because the composition contains a (meth)acryloxyalkyl-modified organopolysiloxane, problems with changes in hardness are likely to occur in response to high-energy beams. Accordingly, the invention differs in that the technical problem and solution involve prevention of the discoloration of a transparent adhesive layer itself formed from a silicone-based pressure-sensitive adhesive, and it is difficult to solve this problem.

PRIOR ART DOCUMENTS

Patent Documents

Patent Document 1: Japanese Unexamined Patent Application Publication (Translation of PCT Application) No. 2014-522436

Patent Document 2: Japanese Unexamined Patent Application Publication (Translation of PCT Application) No. 2013-512326

Patent Document 3: Japanese Unexamined Patent Application Publication No. S62-181357

Patent Document 4: Japanese Unexamined Patent Application Publication No. 2010-248413

Patent Document 5: Japanese Unexamined Patent Application Publication No. 2006-213810

Patent Document 6: Japanese Unexamined Patent Application Publication No. 2007-9189

SUMMARY OF THE INVENTION

Problems to be Solved by the Invention

The present invention was conceived in order to solve the problems described above, and an object thereof is to provide a curing-reactive organopolysiloxane composition that forms a pressure-sensitive adhesive layer which is curable by a hydrosilylation reaction, has excellent adhesiveness and handleability, and is capable of maintaining high transparency over an extended period of time without developing problems such as discoloration or coloration, even when subjected to long-term aging at a high temperature and even when exposed to high-energy rays such as UV rays over an extended period of time. Another object of the present invention is to provide a use of the curing-reactive organopolysiloxane composition or a cured product thereof as a pressure-sensitive adhesive layer, a use of the same as an electronic material or a member for a display device, and an electronic part or a display device provided with the same.

Means for Solving the Problems

As a result of conducting dedicated research on the problems described above, the present inventors arrived at the present invention. Specifically, one object of the present invention is achieved by a curing-reactive organopolysiloxane composition including a hydrosilylation reaction, wherein a content of platinum-based metal among a solid content is in a range of from 0.1 to 50 ppm, and an adhesive force of a polymethyl methacrylate sheet with a thickness of 2 mm provided with a cured layer with a thickness of 50 μm obtained by curing the composition, as measured at a tensile speed of 300 mm/min using a 180° peel test method according to JIS Z 0237, is not less than 0.02 N/25 mm. In addition, the problems described above can be solved by the use of the curing-reactive organopolysiloxane composition or a cured product thereof as a pressure-sensitive adhesive layer, the use of the same as an electronic material or a member for a display device, and an electronic part or a display device provided with the same. Note that the solid content is a component that forms the cured layer as a result of a curing reaction, and does not include a volatile component such as a solvent.

That is, the present invention provides the following:

"[1] A curing-reactive organopolysiloxane composition including a hydrosilylation reaction, wherein a content of platinum-based metal among a solid content is in a range of from 0.1 to 50 ppm, and an adhesive force of a polymethyl methacrylate sheet with a thickness of 2 mm provided with a cured layer with a thickness of 50 μm obtained by curing the composition, as measured at a tensile speed of 300 mm/min using a 180° peel test method according to JIS Z 0237, is not lower than 0.02 N/25 mm.

[2] The curing-reactive organopolysiloxane composition according to [1], wherein a b* value, which is measured with an L*a*b* color system as prescribed in JIS Z 8729, of a cured layer with a thickness of 100 μm obtained by curing the composition is not greater than 0.15.

[3] The curing-reactive organopolysiloxane composition according to [1] or [2], wherein when a cured layer with a thickness of 100 μm obtained by curing the composition is aged for 300 hours at 105° C. or irradiated for 75 hours with UV light using a mercury lamp with an intensity of 12 $mW/cm^2$ at 365 nm and an intensity of 3.5 $mW/cm^2$ at 254 nm, a change (Δb*) in a b* value measured with an L*a*b* color system as prescribed in JIS Z 8729 is not greater than 0.20.

[4] The curing-reactive organopolysiloxane composition according to any one of [1] to [3], wherein a content of platinum-based metal among solid content is in a range of from 0.1 to 30 ppm; a cured layer with a thickness of 100 μm obtained by curing the composition is substantially transparent; a b*value thereof measured with an L*a*b* color system as prescribed in JIS Z 8729 is not greater than 0.10; and when the cured layer is aged for 300 hours at 105° C. or irradiated for 75 hours with UV light using a mercury lamp with an intensity of 12 $mW/cm^2$ at 365 nm and an intensity of 3.5 $mW/cm^2$ at 254 nm, a change (Δb*) in a b* value measured with an L*a*b* color system as prescribed in JIS Z 8729 is not greater than 0.15.

[5] The curing-reactive organopolysiloxane composition according to any one of [1] to [4], wherein the composition contains the following components (A) to (C):

(A) a straight-chain or branched-chain organopolysiloxane having a number of alkenyl groups greater than 1 on average in the molecule;

(B) an organopolysiloxane resin; and (C) an organohydrogenpolysiloxane having at least two Si—H bonds in the molecule.

[6] The curing-reactive organopolysiloxane composition according to [5], wherein a molar ratio of silicon-bonded hydrogen atom (SiH) groups in component (C) to alkenyl groups in the composition is in a range of from 0.1 to 100.

[7] The curing-reactive organopolysiloxane composition according to [5] or [6], wherein at least a part of component (A) is (A1) a raw rubber-like alkenyl group-containing organopolysiloxane having a viscosity of not less than 100,000 mPa-s at 25° C. or having a plasticity in a range of from 50 to 200 as measured in accordance with a method as prescribed in JIS K6249;

at least a part of component (B) is a resin which consists of (B1) $R_3SiO_{1/2}$ units (M units) and $SiO_{4/2}$ units (Q units) and may have a hydroxyl group or a hydrolyzable group, wherein R is a monovalent organic group and not less than 90 mol % of R is an alkyl group or a phenyl group having a carbon number of from 1 to 6; and a content of a vinyl ($CH_2{=}CH$) portion in the alkenyl group in component (A1) is in a range of from 0.005 to 0.400 wt. %, and a content of component (B) is in a range of from 1 to 500 parts by mass with respect to a total of 100 parts by mass of components (A) and (C) in the composition.

[8] The curing-reactive organopolysiloxane composition according to any one of [1] to [7], further containing at least one type of (D) curing retarder.

[9] The curing-reactive organopolysiloxane composition according to [8], wherein a viscosity of the composition after 8 hours at room temperature from immediately after preparation of the composition is not greater than 1.5 times a viscosity immediately after the preparation of the composition, and the composition is curable at 80 to 200° C.

[10] A pressure-sensitive adhesive composition including the curing-reactive organopolysiloxane composition according to any one of [1] to [9].

[11] A cured product obtained by curing the curing-reactive organopolysiloxane composition according to any one of [1] to [9].

[12] A pressure-sensitive adhesive layer obtained by curing the curing-reactive organopolysiloxane composition according to any one of [1] to [9].

[13] The pressure-sensitive adhesive layer according to [12], which is film-like and substantially transparent.

[14] A laminate including a cured product obtained by curing the curing-reactive organopolysiloxane composition according to any one of [1] to [9] on a film-like substrate.

[15] The laminate according to [14], wherein the cured layer is a pressure-sensitive adhesive layer, and a release layer for the pressure-sensitive adhesive layer is provided on the film-like substrate.

[16] An electronic material or a member for a display device obtained by curing the curing-reactive organopolysiloxane composition according to any one of [1] to [9].

[17] An electronic part or a display device containing the electronic material or member for a display device according to [16].

[18] A display panel or a display including the film-like and substantially transparent pressure-sensitive adhesive layer according to [13].

[19] A touch panel including a substrate having a conductive layer formed on one surface; and a cured layer obtained by curing the curing-reactive organopolysiloxane composition according to any one of [1] to [9], which is attached to the conductive layer of the substrate or a surface on an opposite side thereof.

[20] The touch panel according to [19], wherein the substrate on which the conductive layer is formed is a resin film or a glass film having an ITO layer formed on one surface.".

Effects of the Invention

The curing-reactive organopolysiloxane composition of the present invention can form a pressure-sensitive adhesive layer which is curable by a hydrosilylation reaction, has excellent adhesiveness and handleability, and is capable of maintaining high transparency over an extended period of time without developing problems such as discoloration or coloration, even when subjected to long-term aging at a high temperature and even when exposed to high-energy rays such as UV rays over an extended period of time. Further, the curing-reactive organopolysiloxane composition or a cured product thereof can be suitably used as a pressure-sensitive adhesive layer, an electronic material, or a member for a display device, and an electronic component or display device provided with the same can efficiently form a pressure-sensitive adhesive layer. Therefore, industrial production is easy, and problems with discoloration or coloration are unlikely to occur, even when the transparent pressure-sensitive adhesive layer is heated or exposed to high-energy rays, which yields the advantage that problems such as the deterioration of display function or poor appearance are unlikely to occur. In particular, a display device such as a display panel, a display, or a touch panel obtained by providing a pressure-sensitive adhesive layer obtained by curing the organopolysiloxane composition of the present invention can be provided.

MODE FOR CARRYING OUT THE INVENTION

Organopolysiloxane Composition

First, the curing-reactive organopolysiloxane composition of the present invention will be described. The composition forms a pressure-sensitive adhesive cured layer as a result of a curing reaction including a hydrosilylation reaction, and does not develop problems such as discoloration or coloration, even when subjected to long-term aging at a high temperature and even when exposed to high-energy rays such as UV rays over an extended period of time.

Platinum-Based Metal Content

A first feature of such an organopolysiloxane composition is that the composition is hydrosilylation reaction curable and that a content of platinum-based metal among the solid content is within the range of from 0.1 to 50 ppm. Platinum-based metal is a main component of a hydrosilylation reaction catalyst and is a component that promotes the curing of the composition of the present invention, however at the same time, the platinum-based metal causes discoloration or coloration of the pressure-sensitive adhesive layer after curing when heated or exposed to high-energy rays such as UV rays. Accordingly, the content of platinum-based metal is preferably reduced as much as possible within a range that does not adversely affect curability. Here, the platinum-based metal is a metal element of group VIII consisting of platinum, rhodium, palladium, ruthenium, and iridium, however, in practical use, the content of the platinum-metal excluding the ligands of the hydrosilylation catalyst is preferably within the range described above. Note that the solid content is a component that forms the cured layer (primarily a main agent, an adhesion-imparting component, a crosslinking agent, a catalyst, and other non-volatile components) when the organopolysiloxane composition of the present invention is subjected to a curing reaction, and does not include volatile components such as solvents that volatilize at the time of heat curing.

On the other hand, the organopolysiloxane composition of the present invention must form a pressure-sensitive adhesive cured layer, and therefore typically contains an organopolysiloxane resin and an organopolysiloxane containing an alkenyl group and has a high degree of polymerization as a main component. These components have a lower alkenyl group content in the molecule in comparison to vinyl polysiloxanes or the like having a low degree of siloxane polymerization used in silicone-based sealing agents and the like, and the density of alkenyl groups in the composition tends to be low, and therefore, if the content of the platinum-based metal in the composition is low, curing defects may occur even when curing is performed for a long period of time at a high temperature. In addition, a pressure-sensitive adhesive layer is typically cured industrially within 1 to 10 minutes, and it is often difficult to employ a long curing process.

Preferably, the content of the platinum-based metal in the organopolysiloxane composition of the present invention may be not greater than 45 ppm, not greater than 35 ppm, not greater than 30 ppm, not greater than 25 ppm, or not greater than 20 ppm. When the content of the platinum-based metal exceeds 50 ppm, this causes discoloration or coloration of the transparent pressure-sensitive adhesive layer, in particular, after curing or when heated or exposed to high-energy rays such as UV rays. On the other hand, from the perspective of the curability of the organopolysiloxane composition, the content of the platinum-based metal is not lower than 0.1 ppm, and when the content is lower than this lower limit, this may cause curing defects. On the other hand, there is a demand for a transparent pressure-sensitive adhesive layer to be formed by a short curing reaction industrially, so even when the type of the hydrosilylation reaction catalyst or curing retarder is optimized, the content of the platinum-based metal in the composition may be not lower than 0.5 ppm, not lower than 1.0 ppm, not lower than 2.0 ppm, or not lower than 3.0 ppm.

From the perspective of industrial production, it is particularly preferable for content of the platinum-based metal in the composition to be designed within the range of from 0.1 to 30 ppm, from 1.0 to 30 ppm, from 2.0 to 30 ppm, or from 3.0 to 25 ppm. If the content is lower than the lower limit described above, curing may not be possible in a short period of time even at an industrially typical curing temperature (80 to 200° C.), whereas when the content exceeds the upper limit described above, the discoloration or coloration of the transparent pressure-sensitive adhesive layer may occur over a long period of time, which may become a direct cause of the deterioration or reduction of display function in the transparent pressure-sensitive adhesive layer of a display device or the like.

Range of Pressure Sensitive Adhesion and Adhesive Force

The organopolysiloxane composition of the present invention is characterized in that a cured layer obtained by curing the composition by a hydrosilylation reaction is a pressure-sensitive adhesive. Specifically, the adhesive force of a polymethyl methacrylate sheet with a thickness of 2 mm provided with a cured layer with a thickness of 50 μm obtained by curing the organopolysiloxane composition of the present invention, as measured at a tensile speed of 300 mm/min using a 180° peel test method according to JIS Z 0237, is not lower than 0.02 N/25 mm. Note that the thickness (50 μm) described above is the thickness of the cured layer itself serving as a reference for objectively defining the adhesive force of the cured layer of the present invention. It goes without saying that the organopolysiloxane composition of the present invention is not limited to a thickness of 50 μm and may be used as a cured layer or a pressure-sensitive adhesive layer of any thickness.

For a cured layer with a thickness of 50 μm, the function as a pressure-sensitive adhesive layer is insufficient when the adhesive force is lower than the lower limit described above. Note that by using the components described above, a pressure-sensitive adhesive layer having an adhesive force within the range of from 0.02 to 35 N/25 mm can typically be designed.

From the perspective of use as a pressure-sensitive adhesive layer for a display device, in particular, a cured layer with a thickness of 50 μm preferably has an adhesive force of not lower than 1.0 N/25 mm and more preferably not lower than 2.0 N/25 mm under the conditions described above.

Properties Related to Transparency, Color Tone, and Coloration/Discoloration of the Cured Layer Due to the features described above, in particular, the fact that the content of the platinum-based metal in the cured layer is reduced, a cured layer using the organopolysiloxane composition of the present invention is characterized in that the cured layer is substantially transparent and is not colored immediately after curing, and that, even when exposed to high temperatures or high-energy beams such as UV rays over an extended period of time, the color tone thereof does not change significantly, and there is no loss of transparency. Specifically, the b* value, which is measured with the L*a*b* color system as prescribed in JIS Z 8729, immediately after curing a cured layer with a thickness of 100 μm obtained by curing the organopolysiloxane composition of the present invention is not greater than 0.15 and more preferably not greater than 0.10. Having such a b* value means that the cured layer is substantially transparent and is not colored yellow, and when the b* value of a cured layer with a thickness of 100 μm exceeds the upper limit described above, the cured layer may not be particularly suitable as a pressure-sensitive adhesive layer for a display device due to problems with transparency or yellow coloration. In addition, as a pressure-sensitive adhesive layer for a display device, a film-like cured product with a thickness of from 10 to 1000 μm obtained by curing the organopolysiloxane composition of the present invention must be visually transparent for practical use. More objectively, when a value for air is 100%, the transmittance of light at a wavelength of 450 nm of the pressure-sensitive adhesive layer for a display device formed from a cured layer with a thickness of 100 μm is 80% or higher and preferably 90% or higher when the value for air is 100%, and can be easily designed to 95% or higher.

Even when the cured layer of the present invention is exposed to high temperatures or high-energy beams such as UV rays for an extended period of time, the color tone thereof does not change significantly, and the problem of yellowing, in particular, does not occur. Specifically, even if any of the following evaluations are made, the change (Δb*) in the b* value measured with the L*a*b* color system as prescribed in JIS Z 8729 immediately after evaluation, for a cured layer with a thickness of 100 μm obtained by curing the organopolysiloxane composition of the present invention, is not greater than 0.20 and preferably not greater than 0.15. Note that Δb* is an absolute value of the numerical change.

(1) Thermal aging evaluation: The cured layer is aged for 300 hours at 105° C.

(2) High-energy beam irradiation: A sample of the cured layer is irradiated for 75 hours at room temperature with UV light using a mercury lamp (for example, Optical Module X or the like manufactured by Ushio Electric Co., Ltd.) having an intensity of 12 $mW/cm^2$ at 365 nm and an intensity of 3.5 $mW/cm^2$ at 254 nm.

Suitable Composition

As described above, the organopolysiloxane composition of the present invention forms a pressure-sensitive adhesive layer that is cured by a hydrosilylation reaction and has a certain adhesive force, and the composition therefore preferably contains at least the following components (A) to (C):

(A) a straight-chain or branched-chain organopolysiloxane having a number of alkenyl groups greater than 1 on average in the molecule;

(B) an organopolysiloxane resin; and (C) an organohydrogenpolysiloxane having at least two Si—H bonds in the molecule.

In addition, since the composition contains a hydrosilylation reaction catalyst, the composition preferably further contains (D) a curing retarder from the perspective of handleability, and may further contain other additives to an extent that is not at odds with the object of the present invention. Hereinafter, each component will be described.

The alkenyl group-containing organopolysiloxane of component (A) is the main agent (base polymer) of this composition and contains an alkenyl group bonded to a number of silicon atoms greater than 1 on average in each molecule, and the preferable number of alkenyl groups is not less than 1.5 groups in each molecule. Examples of the alkenyl groups of the organopolysiloxane of component (A) include alkenyl groups having a carbon number of from 2 to 10 such as vinyl groups, allyl groups, butenyl groups, pentenyl groups, hexenyl groups, and heptenyl groups, and vinyl groups or hexenyl groups are particularly preferable. Examples of the bonding position of the alkenyl groups of component (A) include the molecular chain terminals and/or the molecular side chains. Note that component (A) may contain a single component or may be a mixture of two or more different components.

Examples of silicon-bonded organic groups other than alkenyl groups in the organopolysiloxane of component (A) include alkyl groups such as methyl groups, ethyl groups, propyl groups, butyl groups, pentyl groups, hexyl groups, and heptyl groups; aryl groups such as phenyl groups, tolyl groups, xylyl groups, and naphthyl groups; aralkyl groups such as benzyl groups and phenethyl groups; and halogenated alkyl groups such as chloromethyl groups, 3-chloropropyl groups, and 3,3,3-trifluoropropyl groups; and methyl groups and phenyl groups are particularly preferable.

The molecular structure of component (A) is preferably a straight chain or partially branched straight chain, and may partially include a cyclic, three-dimensional network. Preferably, the main chain consists of repeating diorganosiloxane units and is preferably a straight-chain or branched-chain diorganopolysiloxane capped at both molecular terminals with triorganosiloxy groups. Note that the siloxane units that provide a branched-chain organopolysiloxane are T units or Q units described below.

The properties of component (A) at room temperature may be those of an oily or raw rubber-like substance, and the viscosity of component (A) is not lower than 50 mPa-s and particularly preferably not lower than 100 mPa-s at 25° C. In particular, when the curable silicone composition is a solvent type, at least a part of component (A) is (A1) a raw rubber-like alkenyl group-containing organopolysiloxane having a viscosity of not less than 100,000 mPa-s at 25° C. or having a plasticity (value when a load of 1 kgf is applied for 3 minutes to a 4.2 g spherical sample at 25° C.) in a range of from 50 to 200 as measured in accordance with the method as prescribed in JIS K6249. Even a component (A) with a lower viscosity may be used, however, from the perspective of the technical effects of the present invention, preferably at least 50 mass % of component (A) will be an alkenyl group-containing organopolysiloxane with a high degree of polymerization, which is component (A1), and it is particularly preferable for 75 to 100 mass % of the component to be component (A1).

Although the content of alkenyl groups in component (A1) is not particularly limited, from the perspective of the technical effects of the present invention, the content of the vinyl ($CH_2$═CH) portion in the alkenyl groups in component (A1) (called the "vinyl content" hereinafter) is preferably in the range of from 0.005 to 0.400 wt. % and particularly preferably in the range of from 0.005 to 0.300 wt. %.

The organopolysiloxane resin (B) is an adhesion-imparting component that imparts an adhesive force to the substrate, and is not particularly limited as long as the organopolysiloxane has a three-dimensional structure. Examples include a resin consisting of $R_2SiO_{2/2}$ units (D units) and $RSiO_{3/2}$ units (T units) (wherein each R independently represents a monovalent organic group) and having or not having a hydroxyl group or a hydrolyzable group, a resin consisting of only T units and having or not having a hydroxyl group or a hydrolyzable group, and a resin consisting of $R_3SiO_{1/2}$ units (M units) and $SiO_{4/2}$ units (Q units) and having or not having a hydroxyl group or a hydrolyzable group. In particular, it is preferable to use (B1) a resin consisting of $R_3SiO_{1/2}$ units (M units) and $SiO_{4/2}$ units (Q units) and having a hydroxyl group or a hydrolyzable group (also called an MQ resin). The hydroxyl groups or hydrolyzable groups are directly bonded to silicon of the T units or Q units in the resin, and are groups derived from silane as a raw material or generated as a result of hydrolysis of silane.

The monovalent organic group of R is preferably a monovalent hydrocarbon group having a carbon number of from 1 to 10, examples of which include alkyl groups having a carbon number of from 1 to 10, alkenyl groups having a carbon number of from 2 to 10, aryl groups having a carbon number of from 6 to 10, cycloalkyl groups having a carbon number of from 6 to 10, benzyl groups, phenylethyl groups, and phenylpropyl groups. In particular, preferably at least 90 mol % of R will be an alkyl group or a phenyl group having a carbon number of from 1 to 6, and it is particularly preferable for from 95 to 100 mol % of R to be a methyl group or a phenyl group.

When the organopolysiloxane resin (B) is a resin consisting of $R_3SiO_{1/2}$ units (M units) and $SiO_{4/2}$ units (Q units), the molar ratio of M units to Q units is preferably from 0.5 to 2.0. This is because when the molar ratio is less than 0.5, the adhesive force to the substrate may be diminished, whereas when the molar ratio is greater than 2.0, the cohesive strength of the material constituting the adhesive layer decreases. In addition, D units and Q and T units may also be included in component (B) to an extent that does not impair the characteristics of the present invention, and component (B) may use a combination of two or more types of organopolysiloxanes. The organopolysiloxane resin (B) may have a hydroxyl group or a hydrolyzable group, and a resin having a hydroxyl group or a hydrolyzable group, a resin not having a hydroxyl group or a hydrolyzable group, or a mixture thereof may be used without restriction. When this organopolysiloxane resin has a hydroxyl group or a hydrolyzable group, the resin ordinarily contains from 0.1 to 5.0 mass % of hydroxyl groups or hydrolyzable groups.

Component (C) is an organohydrogenpolysiloxane having two or more Si—H bonds in the molecule and is a cross-linking agent of the organopolysiloxane composition of the present invention. The molecular structure of component (C) is not particularly limited, and examples thereof include a straight chain, a partially branched straight chain, a branched chain, a cyclic, or an organopolysiloxane resin structure, and a straight chain, a partially branched straight chain, or an organopolysiloxane resin structure is preferable. The bonding position of silicon-bonded hydrogen atoms is not particularly limited, and examples thereof include molecular terminals, side chains, and both molecular terminals and side chains.

The content of the silicon-bonded hydrogen atoms is preferably from 0.1 to 2.0 wt. % and more preferably from 0.5 to 1.7 wt. %.

Examples of silicon-bonded organic groups include alkyl groups having a carbon number of from 1 to 8 such as methyl groups, ethyl groups, propyl groups, butyl groups, and octyl groups; aryl groups such as phenyl groups and tolyl groups; aralkyl groups such as benzyl groups and phenethyl groups; and halogenated alkyl groups such as 3-chloropropyl groups and 3,3,3-trifluoropropyl groups; however, preferably at least 50 mol % of the total number of these groups will be alkyl groups or phenyl groups having a carbon number of from 1 to 8. From the perspective of ease of manufacture and compatibility with the preferred components (A) and (B) described above, the other organic groups are preferably methyl groups or phenyl groups.

When component (C) of the present invention is an organohydrogenpolysiloxane, which is an organopolysiloxane resin, examples thereof include organopolysiloxane copolymers consisting of siloxane units represented by the general formula: $R'_3SiO_{1/2}$, siloxane units represented by the general formula $R'_2HSiO_{1/2}$, and siloxane units represented by the formula: $SiO_{4/2}$; organopolysiloxane copolymers consisting of siloxane units represented by the general formula: $R'_2HSiO_{1/2}$ and siloxane units represented by the formula: $SiO_{4/2}$; organopolysiloxane copolymers consisting of siloxane units represented by the general formula: $R'_2HSiO_{1/2}$ and siloxane units represented by the formula: $R''SiO_{3/2}$; organopolysiloxane copolymers consisting of siloxane units represented by the general formula: $R'HSiO_{2/2}$, siloxane units represented by the general formula: $R'SiO_{3/2}$, or siloxane units represented by the formula: $HSiO_{3/2}$; and mixtures of two or more types of these organopolysiloxanes. Note that R' in the formulas is an alkyl group having a carbon number of from 1 to 8, an aryl group, an aralkyl group, or a halogenated alkyl group, and examples thereof are the same as those described above.

Specific examples of component (C) include tris(dimethylhydrogensiloxy)methylsilane, tetra(dimethylhydrogensiloxy)silane, methylhydrogenpolysiloxanes capped at both terminals with trimethylsiloxy groups, dimethylsiloxane/methylhydrogensiloxane copolymers capped at both terminals with trimethylsiloxy groups, dimethylsiloxane/methylhydrogensiloxane copolymers capped at both terminals with dimethylhydrogensiloxy groups, cyclic methylhydrogen oligosiloxanes, cyclic methylhydrogensiloxane/dimethylsiloxane copolymers, methylhydrogensiloxane/diphenylsiloxane copolymers capped at both molecular terminals with trimethylsiloxy groups, methylhydrogensiloxane/diphenylsiloxane/dimethylsiloxane copolymers capped at both molecular terminals with trimethylsiloxy groups, hydrolytic condensates of trimethylsilanes, copolymers consisting of $(CH_3)_2HSiO_{1/2}$ units and $SiO_{4/2}$ units, copolymers consisting of $(CH_3)_2HSiO_{1/2}$ units, $SiO_{4/2}$ units, and $(C_6H_5)SiO_{3/2}$ units, copolymers consisting of $(CH_3)_2HSiO_{1/2}$ units and $CH_3SiO_{3/2}$ units, and mixtures of two or more types thereof.

In the case of a straight-chain structure, in particular, a methylhydrogenpolysiloxane represented by the molecular structural formula:

$$R^TMe_2SiO(Me_2SiO)_q(HMeSiO)_rSiMe_2R^T \quad (7)$$

(wherein Me is a methyl group, RT is a methyl group or a hydrogen atom, and q and r are numbers satisfying $0.3 \le r/(q+r) \le 1$ and $10 \le (q+r) \le 200$) is preferable. Note that component (C) may use two or more different types in combination.

Similarly, the following such organosiloxanes may be given as examples. Note that in the formulas, Me and Ph respectively represent a methyl group and a phenyl group, m is an integer from 1 to 100, n is an integer from 1 to 50, and b, c, d, and e are each positive numbers, where the sum of b, c, d, and e in one molecule is 1.

$HMe_2SiO(Ph_2SiO)_mSiMe_2H$ $HMePhSiO(Ph_2SiO)_mSiMePhH$ $HMePhSiO(Ph_2SiO)_m(MePhSiO)_nSiMePhH$ $HMePhSiO(Ph_2SiO)_m(Me_2SiO)_nSiMePhH$ $(HMe_2SiO_{1/2})_b(PhSiO_{3/2})_c$ $(HMePhSiO_{1/2})_b(PhSiO_{3/2})_c$ $(HMePhSiO_{1/2})_b(HMe_2SiO_{1/2})_c(PhSiO_{3/2})_d$ $(HMe_2SiO_{1/2})_b(Ph_2SiO_{2/2})_c(PhSiO_{3/2})_d$ $(HMePhSiO_{1/2})_b(Ph_2SiO_{2/2})_c(PhSiO_{3/2})_d$ $(HMePhSiO_{1/2})_b(HMe_2SiO_{1/2})_c(Ph_2SiO_{2/2})_d(PhSiO_{3/2})_e$

The amount of component (C) that is used may be such that the molar ratio of silicon-bonded hydrogen atom (SiH) groups in component (C) to the alkenyl groups in the composition is in a range of from 0.1 to 100, a range of from 0.1 to 50, or a range of from 0.1 to 20. When the amount of the SiH groups falls below the lower limit described above, this may cause curing defects in the composition, whereas when the amount of the SiH groups exceeds the upper limit described above, the amount of unreacted residual curing agent becomes large, which may have adverse effects on curing physical properties such as brittleness of the cured product or may cause problems such as gas generation.

From the perspective of the technical effects of the present invention and, in particular, use as a pressure-sensitive adhesive layer, a mass ratio is preferably from 1 to 50 parts by mass and more preferably from 30 to 400 parts by mass with respect to a total of 100 parts by mass of components (A) and (C) in the composition. This is because when the content of component (B) is lower than the lower limit described above or exceeds the upper limit described above, the adhesive force may be insufficient.

Hydrosilylation Reaction Catalyst

The organopolysiloxane composition of the present invention contains a hydrosilylation reaction catalyst. Examples of hydrosilylation reaction catalysts include platinum-based catalysts, rhodium-based catalysts, and palladium-based catalysts, and platinum-based catalysts are preferable in that they markedly accelerate the curing of the present composition. Examples of this platinum based catalyst include platinum fine powder, chloroplatinic acid, an alcohol solution of chloroplatinic acid, a platinum-alkenyl siloxane complex, a platinum-olefin complex, and a platinum-carbonyl complex, with a platinum-alkenyl siloxane complex particularly preferable. Examples of this alkenyl siloxane include 1,3-divinyl-1,1,3,3-tetramethyldisiloxane, 1,3,5,7-tetramethyl-1,3,5,7-tetravinylcyclotetrasiloxane, alkenyl siloxanes in which some of the methyl groups of these alkenyl siloxanes are substituted with groups selected from the group consisting of nitriles, amides, dioxolanes, and sulfolanes, ethyl groups, phenyl groups, or the like, and alkenyl siloxanes in which the vinyl groups of these alkenyl siloxanes are substituted with allyl groups, hexenyl groups, or the like. In particular, 1,3-divinyl-1,1,3,3-tetramethyldisiloxane is preferable in that the stability of the platinum-alkenyl siloxane complex is good. As the catalyst for promoting the hydrosilylation reaction, a non-platinum based metal catalyst such as iron, ruthenium, iron/cobalt, or the like may be used.

In the present invention, a content of the hydrosilylation reaction catalyst is in a range such that the amount of platinum-based metal is in the range of from 0.1 to 50 ppm with respect to the total amount of the solid content in the composition, and this preferable range is as described in "Platinum-based metal content" above. In general, as described above, in order to ensure the function as a pressure-sensitive adhesive layer in a silicone-based pressure-sensitive adhesive, the use of an alkenyl group-containing organopolysiloxane with a high degree of polymerization and an MQ resin with low reactivity is preferable for the composition. Therefore, the amount of platinum metal is often designed to at most the upper limit described above from the perspective of curability, but a curing-reactive organopolysiloxane composition which sufficiently exhibits a function as a pressure-sensitive adhesive layer even when the amount of platinum is reduced can be provided as a result of a compositional design which utilizes/optimizes (D) a curing retarder.

Component (D) is a curing retarder and is compounded in order to suppress crosslinking reactions between the alkenyl groups in the composition and the SiH groups in component (C) so as to extend the usable life at ordinary temperatures and to enhance the storage stability. Accordingly, in practical use, the component is nearly essential to the curing-reactive organopolysiloxane composition of the present invention.

Specific examples of component (D) include acetylenic compounds, ene-yne compounds, organic nitrogen compounds, organic phosphorus compounds, and oxime compounds. Specific examples include alkyne alcohols such as 3-methyl-1-butyne-3-ol, 3,5-dimethyl-1-hexyne-3-ol, 3-methyl-1-pentyne-3-ol, 1-ethynyl-1-cyclohexanol, and phenyl butanol; ene-yne compounds such as 3-methyl-3-pentene-1-yne and 3,5-dimethyl-1-hexyne-3-yne; methylalkenylcyclosiloxanes such as 1,3,5,7-tetramethyl-1,3,5,7-tetravinylcyclotetrasiloxane and 1,3,5,7-tetramethyl-1,3,5,7-tetrahexenylcyclotetrasiloxane; and benzotriazoles.

From the perspective of the curing behavior of the composition, the curing-reactive organopolysiloxane composition of the present invention is preferably curable at 80 to 200° C. with an increase in viscosity of 1.5 times after 8 hours at room temperature after the preparation of the composition. The suppression of thickening is important from the perspective of handleability, pot life, and characteristics after curing, and even if the content of the platinum-based metal is low, the curability can be ensured by curing at high temperature of at least a certain temperature (80 to 200° C.). Note that such a composition can be realized by selecting a suitable combination and compounded amounts of each of the components described above, the hydrosilylation catalyst, and component (D).

In addition to the preferred components (A) and (B) described above, the organopolysiloxane composition of the present invention may also contain an organic solvent as a solvent. The type and compounded amount of the organic solvent are adjusted out of consideration of application workability or the like. Examples of organic solvents include aromatic hydrocarbon-based solvents such as toluene, xylene, and benzene; aliphatic hydrocarbon-based solvents such as heptane, hexane, octane, and isoparaffin; ester-based solvents such as ethyl acetate and isobutyl acetate; ether-based solvents such as diisopropyl ether and 1,4-dioxane; chlorinated aliphatic hydrocarbon-based solvents such as trichloroethylene, perchloroethylene, and methylene chloride; and solvent volatile oils; and two or more types may be combined in accordance with the wettability of the sheet-like substrate or the like. A compounded amount of the organic solvent is preferably an amount such that a mixture of components (A) to (C) can be uniformly applied to a sheet-like substrate surface. For example, the compounded amount may be from 5 to 300 parts by mass per total of 100 parts by mass of components (A), (B), and (C).

The organopolysiloxane composition of the present invention may optionally contain components other than the components described above to an extent that does not impair the technical effects of the present invention. For example, the composition may contain: an adhesion promoter; a non-reactive organopolysiloxane such as a polydimethylsiloxane or a polydimethyldiphenylsiloxane; an antioxidant such as a phenol-type, a quinone-type, an amine-type, a phosphorus-type, a phosphite-type, a sulfur-type, or a thioether-type antioxidant; a flame retardant such as a phosphate ester-type, a halogen-type, a phosphorus-type, or an antimony-type flame retardant; and one or more types of antistatic agents consisting of a cationic surfactant, an anionic surfactant, a non-ionic surfactant, or the like. Note that in addition to these components, pigments, dyes, inorganic fine particles, or the like may be optionally compounded, however, it is preferable to avoid compounding optional components that diminish optical properties such as transparency or cause coloration of the pressure-sensitive adhesive layer. The method of preparing the organopolysiloxane composition of the present invention is not particularly limited and is performed by homogeneously mixing the respective components. A solvent may be added as necessary, and the composition may be prepared by mixing at a temperature of from 0 to 200° C. using a known stirrer or kneader.

The organopolysiloxane composition of the present invention forms a coating film when applied to a substrate and forms a cured product by heating under temperature conditions of from 80 to 200° C. and preferably under temperature conditions of from 90 to 190° C. Examples of application methods include gravure coating, offset coating, offset gravure, roll coating, reverse roll coating, air knife coating, curtain coating, and comma coating.

Use as a Pressure-Sensitive Adhesive Layer

The cured product of the present invention can be used as a substantially transparent pressure-sensitive adhesive layer, in particular. Here, substantially transparent means that the composition is visually transparent when a film-shaped cured product with a thickness of from 10 to 1000 μm is formed. In general, for a film-like cured product with a thickness of 100 μm, the transmittance of light at a wavelength of 450 nm is 80% or higher and preferably 90% or higher when the value for air is 100%, and can be easily designed to 95% or higher. In addition, in order to improve adhesion with the adherend, surface treatment such as primer treatment, corona treatment, etching treatment, or plasma treatment may be performed on the surface of the pressure-sensitive adhesive layer or the substrate.

The curable organopolysiloxane composition of the present invention is cured by applying the composition to a release liner, then heating under the temperature conditions described above, and then, after the release liner is peeled off and the composition is attached to a film-like substrate, a tape-like substrate, or a sheet-like substrate (called a "film-like substrate" hereinafter) or applied to a film-like substrate, curing by heating at the temperature conditions described above so as to form a pressure-sensitive adhesive layer on the surface of the substrate. A laminate provided with a cured layer—in particular, a film-like pressure-sensitive adhesive layer—obtained by curing the organopolysiloxane composition of the present invention on these film-like substrates may be used for adhesive tapes, adhesive bandages, low-temperature supports, transfer films, labels, emblems, and decorative or explanatory signs. Further, a cured layer obtained by curing the organopolysiloxane composition of the present invention may be used to assemble automobile parts, toys, electronic circuits, or keyboards. Alternatively, a cured layer formed by curing the organopolysiloxane composition of the present invention, and particularly a film-like pressure-sensitive adhesive layer, may be used in the construction and use of a laminated touch screen or flat panel display.

Examples of types of substrates include paperboard, cardboard paper, clay-coated paper, polyolefin laminate paper, polyethylene laminate paper in particular, synthetic resin films and sheets, natural fiber cloth, synthetic fiber cloth, artificial leather cloth, and metal foil. In particular, synthetic resin films and sheets are preferable, and examples of synthetic resins include polyimides, polyethylenes, polypropylenes, polystyrenes, polyvinyl chlorides, polyvinylidene chlorides, polycarbonates, polyethylene terephthalates, cyclopolyolefins, and nylons. In particular, when heat resistance is required, a heat-resistant synthetic resin film such as a polyimide, polyetheretherketone, polyethylene naphthalate (PEN), liquid crystal polyacrylate, polyamide-imide, or polyether sulfone is suitable. On the other hand, in applications such as a display device in which visibility is required, a transparent substrate—specifically, a transparent material such as a polypropylene, polystyrene, polyvinylidene chloride, polycarbonate, polyethylene terephthalate, or PEN—is suitable.

The substrate described above is preferably a film-like or a sheet-like substrate. A thickness thereof is not particularly limited and can be designed with a desired thickness in accordance with the application. Further, in order to improve adhesion between a support film and the pressure-sensitive adhesive layer, a support film subjected to primer treatment, corona treatment, etching treatment, or plasma treatment may be used. In addition, the surface of the film-like substrate on the opposite side as the pressure-sensitive adhesive layer surface may be subjected to surface treatment such as scratch prevention, anti-soiling, fingerprint adhesion prevention, anti-glare, anti-reflection, or anti-static treatment.

As the application method to the substrate, gravure coating, offset coating, offset gravure, roll coating using an offset transfer roll coater, reverse roll coating, air knife coating, curtain coating using a curtain flow coater or the like, comma coating, meyer bar, or another known method used for the purpose of forming a cured layer may be used without limitation.

The coating amount can be designed at a desired thickness in accordance with the application such as a display device, and when used as a transparent pressure-sensitive adhesive layer, in particular, the thickness of the pressure-sensitive adhesive layer after curing may be from 1 to 1000 μm, from 5 to 900 μm, or from 10 to 800 μm, however, there is no limitation thereto.

When the cured layer obtained by curing the organopolysiloxane composition of the present invention is a pressure-sensitive adhesive layer, in particular, a substantially transparent pressure-sensitive adhesive layer, the cured layer is preferably treated as a laminate film that is peelably adhered to a film substrate provided with a release layer having a release-coating capability.

The cured product obtained by curing the organopolysiloxane composition of the present invention is useful as an electronic material, a member for a display device, or a member for a transducer (including sensors, speakers, actuators, and generators), and a suitable application for the cured product is a member for an electronic part or a display device. In particular, a film-shaped cured product, particularly a substantially transparent pressure-sensitive adhesive film, is suitable as a member for a display panel or a display, and is particularly useful in so-called touch panel applications in which a device, particularly an electronic device, can be operated by touching a screen with a fingertip or the like.

In particular, a pressure-sensitive adhesive layer obtained by curing the organopolysiloxane composition of the present invention has excellent transparency and does not develop problems with discoloration or coloration, even when exposed to high temperatures or high-energy beams for a long period of time. Therefore, a display apparatus or display device with excellent high-temperature durability or weather resistance can be designed, and a display apparatus or display device with excellent visibility can be realized by suppressing decreases in screen display function over a long period of time.

Member for Display Panel or Display

A cured product obtained by curing the organopolysiloxane composition of the present invention can be used in the construction and use of a laminated touch screen or flat panel display, and the specific method of use thereof may be a known method of use of a pressure-sensitive adhesive layer (in particular, silicone PSA) without any particular limitation.

For example, a cured product obtained by curing the organopolysiloxane composition of the present invention can be used in the production of a display device such as a touch panel as an optically transparent silicone-based pressure-sensitive adhesive film or an adhesive layer disclosed in Japanese Unexamined Patent Application Publication (Translation of PCT Application) No. 2014-522436 (Patent Document 1) or Japanese Unexamined Patent Application Publication (Translation of PCT Application) No. 2013-512326 (Patent Document 2) described above. Specifically, the cured product obtained by curing the organopolysiloxane composition of the present invention can be used as the adhesive layer or adhesive film described in Patent Document 2 without any particular limitation.

As an example, the touch panel according to the present invention may be a touch panel including a substrate such as a conductive plastic film having a conductive layer formed on one surface, and a cured layer obtained by curing the curable organopolysiloxane composition of the present invention, which is attached to a surface on the side where the conductive layer is formed or on the opposite side thereof. The substrate is preferably a sheet-like or film-like substrate, and an example thereof is a resin film or a glass plate. In addition, the conductive plastic film may be a resin film or a glass plate, in particular, a polyethylene terephthalate film, having an ITO layer formed on one surface thereof. These are disclosed in Japanese Unexamined Patent Application Publication No. (Translation of PCT Application) 2013-512326 (Patent Document 2) and the like described above.

In addition, a cured product obtained by curing the organopolysiloxane composition of the present invention may be used as an adhesive film for a polarizing plate used in the production of a display device such as a touch panel, or may be used as a pressure-sensitive adhesive layer used in bonding between a touch panel and a display module described in Japanese Unexamined Patent Application Publication No. 2013-065009.

INDUSTRIAL APPLICABILITY

Applications of the curing-reactive organopolysiloxane composition and a cured product obtained by curing the same according to the present invention are in no way limited to the disclosure above, and a pressure-sensitive adhesive film provided with a cured product obtained by curing the composition can be used in various display devices for displaying characters, symbols, and images such as television receivers, computer monitors, monitors for personal digital assistants, monitoring monitors, video cameras, digital cameras, mobile phones, personal digital assistants, displays for instrument panels of automobiles or the like, displays for instrument panels of various equipment, devices, and instruments, automatic ticket machines, automated teller machines, on-board display devices, and on-board transmission screens. The surface shape of such a display device may be a curved shape or a bowed shape rather than a flat surface, and examples thereof include curved displays or curved transmission screens used in automobiles (including electric vehicles), aircraft, or the like in addition to various flat panel displays (FPDs). Further, these display devices can display icons for executing functions or programs on a screen or display, notification indicators of e-mail, programs, or the like, and operation buttons for various devices such as car navigation devices, audio devices, and air conditioning devices, and touch panel functions enabling input operations may be added by touching these icons, notification indicators, or operation buttons with a finger. As a device, the present invention can be applied to display devices such as CRT displays, liquid crystal displays, plasma displays, organic EL displays, inorganic EL displays, LED displays, surface electrolytic displays (SEDs), and field emitting displays (FEDs), or touch panels utilizing the same.

A pressure-sensitive adhesive layer obtained by curing the curing-reactive organopolysiloxane composition of the present invention has excellent adhesiveness and handleability and is capable of maintaining high transparency over an extended period of time without developing problems such as discoloration or coloration even when subjected to long-term aging at a high temperature and even when exposed to high-energy rays such as UV rays over an extended period of time. Therefore, the pressure-sensitive adhesive layer can be suitably used in a vehicle display device with excellent visibility and operability of the display content over an extended period of time, and in particular, a vehicle display device having a curved screen or a curved display and optionally equipped with a touch panel function. For example, vehicle display devices equipped with curved display surfaces are disclosed in Japanese Unexamined Patent Application Publication No. 2017-047767, Japanese Unexamined Patent Application Publication No. 2014-182335, Japanese Unexamined Patent Application Publication No. 2014-063064, Japanese Unexamined Patent Application Publication No. 2013-233852, and the like, however, the pressure-sensitive adhesive layer of the present invention can be suitably applied or replaced as part or all of an adhesive layer or a pressure-sensitive adhesive layer for which transparency is required in these documents. Further, it goes without saying that currently used adhesive layers or pressure-sensitive adhesive layers requiring transparency may be used as a substitute for other known curved display devices as well, and in order to further leverage the advantages of the pressure-sensitive adhesive of the present invention, it is preferable to adjust the design of the display device or the thickness of the member using known techniques.

Note that a transparent film-like substrate provided with the pressure-sensitive adhesive layer of the present invention may be used for the purpose of scratch prevention, dirt prevention, fingerprint adhesion prevention, static prevention, glare prevention, peep prevention, and the like of these display surfaces.

EXAMPLES

Examples of the present invention and comparative examples are described hereinafter. Note that "cured" in each of the examples and comparative examples means that each composition has fully cured under the respective curing conditions.

Preparation of Curing-Reactive Organopolysiloxane Composition

The curing-reactive organopolysiloxane compositions illustrated in each of the examples and Comparative Examples 1 and 2 were prepared using the components shown in Table 1.

Adhesive Force Measurement

Each composition was applied to a PET film (manufactured by Toray Co., Ltd., product name: Lumirror (registered trademark) #50-T60 so that the thickness after curing was 50 μm, and cured for 2 minutes at the temperature indicated in each of the examples and the like (120, 150, 160, or 180° C.). The sample was cut to a width of 20 mm, and the adhesive layer surface was affixed to a PMMA plate (manufactured by Paltec, ACRYLITE L001, 50×120×2 mm) using a roller to form a test piece. The adhesive force (measurement at a width of 20 mm converted to the display unit N/25 mm) was measured at a tensile speed of 300 mm/min using a 180° peel test method in accordance with JIS Z 0237, using an RTC-1210 tensile tester manufactured by Orientec Co., Ltd. Similar adhesive force measurement tests were performed in triplicate for each composition, and the average values are shown in Table 3.

Pot Life

Each composition was left to stand for 8 hours at room temperature (25° C.), and the viscosity of the composition after 8 hours was evaluated as "○" if the viscosity was not greater than 1.5 times the initial value.

Thermal Aging

Each composition was applied to a release liner (manufactured by Dow Corning Corporation, Q27785 release coating applied to a PET film with a thickness of 50 μm) so that the thickness after curing was 100 μm, and after the composition was left to stand for 3 minutes at room temperature, the composition was cured for 3 minutes at the temperature indicated in each of the examples and the like (120, 150, 160, or 180° C.). Thereafter, the sample was affixed to a glass plate (manufactured by Matsuura Glass, 76×52×1 mm, same hereafter), and the portion protruding from the glass plate was cut off to produce a sample for thermal aging.

The sample was subjected to thermal aging for 300 hours in an oven at 85° C. and 85% relative humidity or at 105° C.

UV Irradiation

A sample affixed to a glass plate was produced with the same method as in the case of thermal aging described above. The release liner was then peeled off, and the adhesive layer on the glass plate was directly irradiated with UV rays for 75 hours using an Optical ModuleX manufactured by Ushio Electric Co., Ltd.

Note that the UV ray intensity was 3.5 mW/$cm^2$ at 254 nm, 12 mW/$cm^2$ at 365 nm, and 147 mW/$cm^2$ at 405 nm, and the temperature of the sample irradiated with UV rays at room temperature was 35° C.

(Optical Measurement: Measurement of b* Value of Each Sample)

Each sample was affixed to a glass plate with a method similar to that of the sample produced for thermal aging described above, and after the release liner was peeled off, the b* value of each sample was measured using a similar glass plate as a reference with the CIE 1976 L*a*b*D65 test method at a viewing angle of 2° using a spectrophotometer (manufactured by Konica Minolta, Model No. CM-5).

Note that the release liner was peeled off in the same manner as described above from the sample after thermal aging to measure the b* value.

In addition, since the release liner is already peeled off from the sample after UV irradiation, the b* value was measured directly.

The b* values of each of the samples measured by the method described above (immediately after curing, after thermal aging, and after UV irradiation) are shown in Table 2.

The materials of the curing-reactive organopolysiloxane compositions are shown in Table 1. Note that the viscosity or plasticity of each component was measured at room temperature using the following methods.

Viscosity

The viscosity (mPa-s) is a value measured using a rotary viscometer conforming to JIS K7117-1, and the kinematic viscosity ($mm^2$/s) is a value measured with an Ubbelohde viscometer conforming to JIS Z8803).

Plasticity

The plasticity was expressed as a value measured in accordance with the method prescribed in JIS K 6249 (the thickness when a 1 kgf load was applied for 3 minutes to a 4.2 g spherical sample at 25° C. was read up to 1/100 mm, and this value was multiplied by 100).

TABLE 1

Components of the curing-reactive organopolysiloxane compositions

| Component | Component |
|---|---|
| Component A-a | Vinyl functional polydimethylsiloxane, gum-like (plasticity: 134), vinyl content: 0.018% |
| Component A-b | Vinyl-functional polydimethylsiloxane, gum-like (plasticity: 152), vinyl content: 0.013% |
| Component B | MQ silicone resin consisting of $(CH_3)_3SiO_{1/2}$ units and $SiO_{4/2}$ units, OH content: 1.0%, Xylene solution (solid content: 62.6%) |
| Component C-a | Methylhydrogenpolysiloxane capped at both terminals with trimethylsiloxy groups, viscosity: 20 $mm^2$/s, SiH content: 1.59% |
| Component C-b | $[(CH_3)_2HSiO_{1/2}]_{0.6}[SiO_{4/2}]_{0.4}$ resin, SiH content: 0.97% |
| Component D-a | 3-Methyl-1-butyne-3-ol |
| Component D-b | 3,5-Dimethyl-1-hexyne-3-ol |
| Component D-c | 2-Ethynyl-4-methyl-2-pentene |
| Component E | 1,3,5,7-Tetramethyl-1,3,5,7-tetravinylcyclotetrasiloxane (=cyclic siloxane) |
| Component F-a | Platinum-based hydrosilylation reaction catalyst containing 0.64% platinum |
| Component F-b | Platinum-based hydrosilylation reaction catalyst containing 4.1% platinum |

Note)
Each % in the Table represents wt. %.

Example 1

First, 36.7 parts by weight of the vinyl functional polydimethylsiloxane of component A-b, 100 parts by weight of the MQ silicone resin of component B, 0.287 parts by weight of the methylhydrogenpolysiloxane capped at both terminals by trimethylsiloxy groups of component C-a, 0.0033 parts by weight of the curing retarder of component 0-a, 0.102 parts by weight of the cyclic siloxane of component E, and 62.0 parts by weight of toluene were mixed well at room temperature, and 0.0106 parts by weight of the platinum-based hydrosilylation reaction catalyst of component F-b was added to the mixture to form a curing-reactive organopolysiloxane composition. The content of platinum metal relative to the solid content was 4.24 ppm.

The composition was cured at a curing temperature of 160° C. by the methods described in (Adhesive force measurement) and (Thermal aging) above, and the evaluation results and the like are shown in Tables 2 and 3.

Example 2

First, 36.7 parts by weight of the vinyl functional polydimethylsiloxane of component A-b, 100 parts by weight of the MQ silicone resin of component B, 0.466 parts by weight of the methylhydrogenpolysiloxane capped at both terminals by trimethylsiloxy groups of component C-b, 0.0033 parts by weight of the curing retarder of component D-a, 0.102 parts by weight of the cyclic siloxane of component E, and 62.0 parts by weight of toluene were mixed well at room temperature, and 0.0106 parts by weight of the platinum-based hydrosilylation reaction catalyst of component F-b was added to the mixture to form a curing-reactive organopolysiloxane composition. The content of platinum metal relative to the solid content was 4.23 ppm.

The composition was cured at a curing temperature of 120° C. by the methods described in (Adhesive force measurement) and (Thermal aging) above, and the evaluation results and the like are shown in Tables 2 and 3.

Example 3

First, 20.3 parts by weight of the vinyl functional polydimethylsiloxane of component A-b, 60.3 parts by weight of the MQ silicone resin of component B, 0.466 parts by weight of the methylhydrogenpolysiloxane capped at both terminals by trimethylsiloxy groups of component C-a, 0.050 parts by weight of the curing retarder of component D-a, and 19.2 parts by weight of toluene were mixed well at room temperature, and 0.20 parts by weight of the platinum-based hydrosilylation reaction catalyst of component F-a was added to the mixture to form a curing-reactive organopolysiloxane composition. The content of platinum metal relative to the solid content was 22 ppm.

The composition was cured at a curing temperature of 120° C. by the methods described in (Adhesive force measurement) and (Thermal aging) above, and the evaluation results and the like are shown in Tables 2 and 3.

Example 4

The composition of Example 1 was cured at a curing temperature of 150° C. by the methods described in (Adhesive force measurement) and (Thermal aging) above, and the evaluation results and the like are shown in Tables 2 and 3.

Comparative Example 1

First, 21.6 parts by weight of the vinyl functional polydimethylsiloxane of component A-a, 63.2 parts by weight of the MQ silicone resin of component B, 0.20 parts by weight of the methylhydrogenpolysiloxane capped at both terminals by trimethylsiloxy groups of component C-a, 0.20 parts by weight of the curing retarder of component D-a, and 14.9 parts by weight of toluene were mixed well at room temperature, and 0.90 parts by weight of the platinum-based hydrosilylation reaction catalyst of component F-a was added to the mixture to form a curing-reactive organopolysiloxane composition. The content of platinum metal relative to the solid content was 100 ppm.

The composition was cured at a curing temperature of 120° C. by the methods described in (Adhesive force measurement) and (Thermal aging) above, and the evaluation results and the like are shown in Tables 2 and 3.

Comparative Example 2

First, 21.6 parts by weight of the vinyl functional polydimethylsiloxane of component A-a, 63.2 parts by weight of the MQ silicone resin of component B, 0.20 parts by weight of the methylhydrogenpolysiloxane capped at both terminals by trimethylsiloxy groups of component C-a, 0.20 parts by weight of the curing retarder of component D-a, and 14.9 parts by weight of toluene were mixed well at room temperature, and 0.90 parts by weight of the platinum-based hydrosilylation reaction catalyst of component F-a was added to the mixture to form a curing-reactive organopolysiloxane composition. The content of platinum metal relative to the solid content was 100 ppm.

The composition was cured at a curing temperature of 180° C. by the methods described in (Thermal aging) above, and the evaluation results and the like are shown in Tables 2 and 3.

Comparative Example 3

A 3M 8146-4 Optically Clear Adhesive sold as a cured adhesive film with a thickness of 100 μm was used as Comparative Example 3. An optical measurement was performed by peeling off the release liner on the light release side, affixing the sample to the glass plate described above, and peeling off the release liner on the heavy release side, and the b* value was evaluated using the same spectrophotometer.

TABLE 2 b* values at the initial stage and after thermal aging/UV irradiation (for cured layers with a film thickness of 100 μm)

| b* value | Example 1 | Example 2 | Example 3 | Comparative Example 1 | Comparative Example 2 | Comparative Example 3 |
|---|---|---|---|---|---|---|
| Initial value (immediately after curing) | 0 | 0.01 | 0.03 | 0.10 | 0.26 | 0.03 |
| 85° C./85% relative humidity, 300 hours | −0.08 | −0.07 | 0.03 | 0.28 | 0.30 | −0.02 |
| 105° C., 300 hours | −0.01 | 0 | 0.13 | 0.46 | 0.48 | 0.07 |
| UV irradiation, 75 hours | −0.03 | −0.03 | 0.06 | 0.29 | 0.29 | 0.66 |

TABLE 3

Pot life and curability (adhesive force measurement for cured layers with a film thickness of 50 μm)

| Physical properties | Example 1 | Example 2 | Example 3 | Example 4 | Comparative Example 1 |
|---|---|---|---|---|---|
| Pot life | ○ | ○ | ○ | ○ | ○ |
| Adhesive force of cured layer (N/25 mm) | 19.6 | 19.9 | 19.8 | 23.3 | 21.2 |

As shown in Table 3, each of the compositions in the examples and the cured layers using the same have sufficient adhesive strength equivalent to that of the silicone adhesive shown in Comparative Example 1, and have a sufficient pot life, with no problems such as thickening, even when stored for a long period of time at room temperature. Further, as shown in Table 2, the cured layers using the compositions according to these examples have characteristics such that the b* value is low, transparency is excellent, and there is substantially no coloration or discoloration because the b* value of the cured layer does not fluctuate significantly, even immediately after curing, after thermal aging, and after UV irradiation. On the other hand, each of the adhesive agents described in Comparative Examples 1 to 3 develops problems with discoloration or coloration in that the b* value immediately after curing is large, or the b* value of the cured layer fluctuates significantly after thermal aging or after UV irradiation.

The invention claimed is:

1. An electronic part or a display device containing an electronic material or member for a display device, the electronic material or member being obtained by curing a curing-reactive organopolysiloxane composition which comprises 0.1 to 50 ppm platinum-based metal based on the total amount of the solid content of the curing-reactive organopolysiloxane composition, wherein an adhesive force of a polymethyl methacrylate sheet, with a thickness of 2 mm provided with a cured layer with a thickness of 50 μm obtained by curing the curing-reactive organopolysiloxane composition, as measured at a tensile speed of 300 mm/min using a 180° peel test method according to JIS Z 0237, is not lower than 0.02 N/25 mm;

wherein the curing-reactive organopolysiloxane composition comprises the following components (A) to (C):

(A) a straight-chain or branched-chain organopolysiloxane having a number of alkenyl groups greater than 1 on average in the molecule;

(B) an organopolysiloxane resin, where at least a part of the component (B) is a resin which consists of $R_3SiO_{1/2}$ units and $SiO_{4/2}$ units and optionally having a hydroxyl group or a hydrolyzable group, wherein R is a monovalent organic group and not less than 90 mol % of R is an alkyl group or a phenyl group; and (C) an organohydrogenpolysiloxane having at least two Si—H bonds in the molecule;

wherein a molar ratio of silicon-bonded hydrogen atom (SiH) groups in the component (C) to alkenyl groups in the curing-reactive organopolysiloxane composition is in a range of from 0.1 to 100;

wherein at least a part of the component (A) is (A1) an alkenyl group-containing organopolysiloxane having a viscosity of not less than 100,000 mPa-s at 25° C. or having a plasticity in a range of from 50 to 200 as measured in accordance with a method as prescribed in JIS K6249;

wherein a content of a vinyl ($CH_2{=}CH$) portion in the alkenyl group in the component (A1) is in a range of from 0.005 to 0.400 wt. %, and wherein a content of the component (B) is in a range of from 1 to 500 parts by mass with respect to a total of 100 parts by mass of the components (A) and (C) in the curing-reactive organopolysiloxane composition.

2. The electronic part or display device of claim 1, wherein a b* value, which is measured with an L*a*b* color system as prescribed in JIS Z 8729, of the electronic material or member with a thickness of 100 μm, is not greater than 0.15.

3. The electronic part or display device of claim 1, wherein when the electronic material or member having a thickness of 100 μm is aged for 300 hours at 105° C. or irradiated for 75 hours with UV light using a mercury lamp with an intensity of 12 $mW/cm^2$ at 365 nm and an intensity of 3.5 $mW/cm^2$ at 254 nm, a change (Δb*) in a b* value of the electronic material or member measured before and after thermal aging or before and after UV irradiation measured with an L*a*b* color system as prescribed in JIS Z 8729 is not greater than 0.20.

4. The electronic part or display device of claim 1, wherein the curing-reactive organopolysiloxane composition comprises 0.1 to 30 ppm platinum-based metal based on the total amount of the solid content of the curing-reactive organopolysiloxane composition; the electronic material or member having a thickness of 100 μm obtained by curing the curing-reactive organopolysiloxane composition is substantially transparent; a b*value thereof measured with an L*a*b* color system as prescribed in JIS Z 8729 is not greater than 0.10; and when the electronic material or member is aged for 300 hours at 105° C. or irradiated for 75 hours with UV light using a mercury lamp with an intensity of 12 $mW/cm^2$ at 365 nm and an intensity of 3.5 $mW/cm^2$ at 254 nm, a change (Δb*) in a b* value of the electronic material or member before and after thermal aging or before and after UV irradiation with an L*a*b* color system as prescribed in JIS Z 8729 is not greater than 0.15.

5. The electronic part or display device of claim 1, wherein the curing-reactive organopolysiloxane composition further comprises at least one type of (D) curing retarder.

6. The electronic part or display device of claim 1, wherein a viscosity of the curing-reactive organopolysiloxane composition after 8 hours at room temperature from immediately after preparation of the curing-reactive organopolysiloxane composition is not greater than 1.5 times that of a viscosity immediately after the preparation of the curing-reactive organopolysiloxane composition, and the curing-reactive organopolysiloxane composition is curable at 80 to 200° C.

* * * * *